(12) United States Patent
Ono et al.

(10) Patent No.: US 12,431,775 B2
(45) Date of Patent: Sep. 30, 2025

(54) STATOR MANUFACTURING METHOD

(71) Applicants: AISIN CORPORATION, Aichi (JP); TOYOTA JIDOSHA KABUSHIKI KAISHA, Toyota (JP); DENSO CORPORATION, Kariya (JP)

(72) Inventors: Hiroyuki Ono, Kariya (JP); Kei Enohata, Kariya (JP); Hideharu Ushida, Kariya (JP); Masaya Nakamura, Kariya (JP); Masanari Nishida, Kariya (JP); Fei Tang, Toyota (JP); Tetsuya Sugimoto, Chiryu (JP)

(73) Assignees: AISIN CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 584 days.

(21) Appl. No.: 17/777,733

(22) PCT Filed: Jan. 29, 2021

(86) PCT No.: PCT/JP2021/003283
§ 371 (c)(1),
(2) Date: May 18, 2022

(87) PCT Pub. No.: WO2021/153745
PCT Pub. Date: Aug. 5, 2021

(65) Prior Publication Data
US 2023/0010824 A1    Jan. 12, 2023

(30) Foreign Application Priority Data
Jan. 30, 2020  (JP) .................................. 2020-013844

(51) Int. Cl.
*H02K 15/35* (2025.01)
*B23K 26/322* (2014.01)
(Continued)

(52) U.S. Cl.
CPC ............ *H02K 15/35* (2025.01); *B23K 26/322* (2013.01); *B23K 26/60* (2015.10);
(Continued)

(58) Field of Classification Search
CPC .. H02K 15/35; H02K 15/085; H02K 15/0421; H02K 15/33; H02K 3/12; Y10T 29/49009
(Continued)

(56) References Cited

U.S. PATENT DOCUMENTS 7,445,081 B2 * 11/2008 Tominaga .............. H02K 11/33
                                                    180/444
10,717,153 B2 * 7/2020 Nakamura .............. H01R 4/021
(Continued)

FOREIGN PATENT DOCUMENTS

JP    2009-253068 A    10/2009
JP    2012-161138 A    8/2012
(Continued)

OTHER PUBLICATIONS

Jun. 16, 2023 Search Report issued in European Patent Application No. 21747129.1.
(Continued)

*Primary Examiner* — Thiem D Phan
(74) *Attorney, Agent, or Firm* — Oliff PLC

(57) ABSTRACT

This method of manufacturing a stator includes a step of removing insulating coatings on first surfaces of lead wire portions that are surfaces to be welded, and a step of welding together the first surfaces by a green laser with the insulating coatings on the first surfaces being removed and with insulating coatings on second surfaces opposite the first surfaces being unremoved.

10 Claims, 9 Drawing Sheets

(51) Int. Cl.
*B23K 26/60* (2014.01)
*B23K 101/34* (2006.01)
*B23K 101/38* (2006.01)

(52) U.S. Cl.
CPC ...... *B23K 2101/34* (2018.08); *B23K 2101/38* (2018.08); *Y10T 29/49009* (2015.01)

(58) Field of Classification Search
USPC .......................... 29/596, 598, 604, 606, 732
See application file for complete search history.

(56) References Cited

U.S. PATENT DOCUMENTS

| | | |
|---|---|---|
| 2009/0252184 A1 | 10/2009 | Kase et al. |
| 2018/0036836 A1 | 2/2018 | Nakamura |
| 2018/0085855 A1 | 3/2018 | Schroth et al. |

FOREIGN PATENT DOCUMENTS

| | | |
|---|---|---|
| JP | 2013-109948 A | 6/2013 |
| JP | 2019-140822 A | 8/2019 |
| JP | 2019-155428 A | 9/2019 |
| JP | 2019-221034 A | 12/2019 |

OTHER PUBLICATIONS

Apr. 6, 2021 International Search Report issued in International Patent Application No. PCT/JP2021/003283.

* cited by examiner

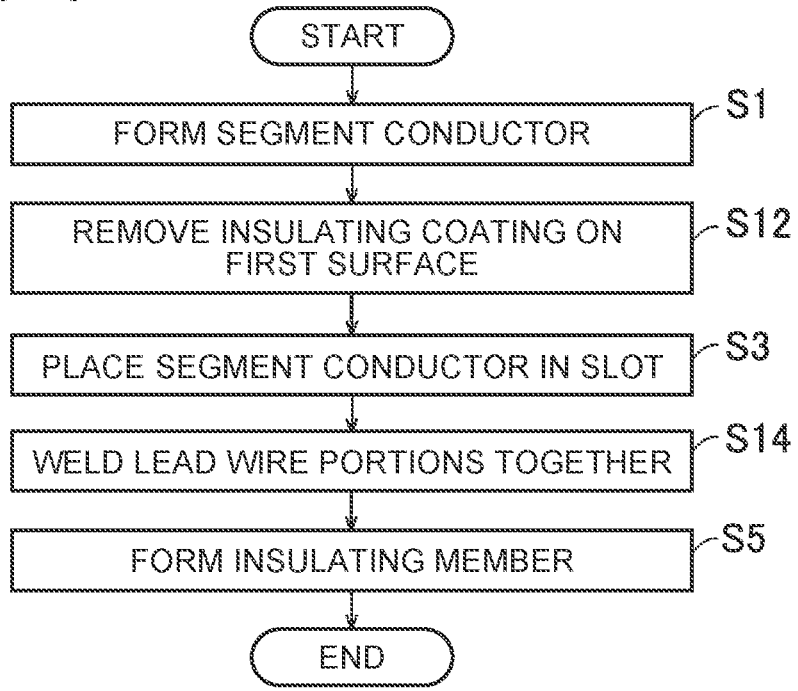
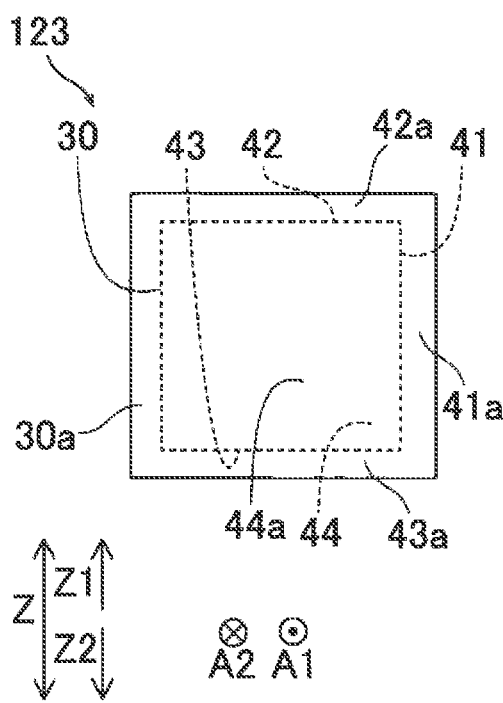
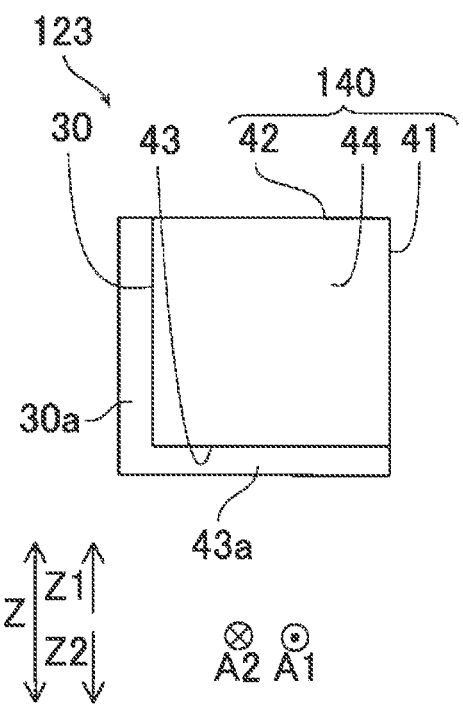

STATOR MANUFACTURING METHOD

TECHNICAL FIELD

The present disclosure relates to a method of manufacturing a stator.

BACKGROUND ART

Stator manufacturing methods that weld the end portions of conductor segments together are known. Such stator manufacturing methods are disclosed in, for example, Japanese Unexamined Patent Application Publication No. 2013-109948 (JP 2013-109948 A).

JP 2013-109948 A discloses a method of welding the end portions of two rectangular wires together by a YAG laser. Specifically, at an end portion of each rectangular wire, an insulating coating on only one side is removed. Then, a YAG laser is applied toward end faces of the rectangular wires with insulating-coating removal surfaces, which has been formed (exposed) by removal of the insulating coatings, facing each other, thereby welding the insulating-coating removal surfaces together.

RELATED ART DOCUMENTS

Patent Documents

Patent Document 1: JP 2013-109948 A

SUMMARY OF THE DISCLOSURE

Problem to be Solved by the Disclosure

However, according to the method of welding rectangular wires disclosed in JP 2013-109948 A, the end portions of the rectangular wires (coils) are welded together by a YAG laser with insulating coatings being provided on surfaces (hereinafter, the opposite surfaces) opposite the insulating-coating removal surfaces, and consequently, the insulating coatings that cover the opposite surfaces may be damaged (carbonized) by heat generated by the welding. Here, since it is difficult to place an insulating member (resin, varnish, etc.) (resin formation, coating) on such damaged (carbonized) insulating coatings, the welded coils may degrade in insulating performance.

One approach to preventing the likelihood that the damaged (carbonized) insulating coatings will make it difficult to place (coat) the insulating member may be to perform welding after removing the insulating coatings on the opposite surfaces. However, this necessitates an additional step of removing the insulating coatings on the opposite surfaces and may complicate the process of welding the rectangular wires accordingly. That is, the problem with use of a conventional method of welding rectangular wires, like the one disclosed in JP 2013-109948 A, is that it is difficult to prevent complication of a welding process while maintaining insulating performance of welded coils.

The present disclosure addresses a problem like the one described above. One purpose of the present disclosure is to provide a stator manufacturing method capable of preventing complication of a process of welding coils together while maintaining insulating performance of the welded coils.

Means for Solving the Problem

To achieve the above purpose, a stator manufacturing method according to one aspect of the disclosure is a method of manufacturing a stator that is provided with multiple coils structured of copper wires covered with insulating coatings, and the method includes a step of removing the insulating coating on a first surface of a lead wire portion that is provided near a tip portion of each of the multiple coils, without removing the insulating coating on a second surface of the lead wire portion. The first surface is a surface to be welded, and the second surface is opposite the first surface. The method further includes a step of placing the multiple coils in slots of a stator core in such a manner that the first surfaces of the lead wire portions of different ones of the coils face each other, and a step of welding together the first surfaces by a green laser, with the insulating coatings on the first surfaces being removed and with the insulating coatings on the second surfaces being unremoved. It is noted that the green laser is used in a broad sense including not only a laser with a wavelength of 532 nm, but also a laser with a wavelength close to 532 nm.

As described above, the stator manufacturing method according to one aspect of this disclosure includes the step of welding the first surfaces together by the green laser with the insulating coatings on the second surfaces being unremoved. Here, most metallic materials have a higher absorptivity for the green laser than for an infrared laser. For this reason, welding the first surfaces together by the green laser, which is relatively highly absorbable by metal, allows heat generated in melted portions of the lead wire portions by application of the laser to be absorbed in metal portions in the vicinity of the melted portions and also makes it relatively hard for the heat to transfer from the melted portions to other portions of the lead wire portions. Thus, even when the first surfaces are welded together by the green laser with the insulating coatings on the second surfaces being unremoved, it is possible to prevent the insulating coatings on the second surfaces from being damaged (carbonized) by the heat of the green laser. This allows easy placement (resin formation, coating) of an insulating member (insulating resin, varnish, etc.) on the tops of the insulating coatings on the second surfaces. Further, since the insulating coatings on the second surfaces are not damaged (carbonized), a step of removing the insulating coatings on the second surfaces beforehand to place the insulating member (resin formation, coating) is omittable. Therefore, it is possible to prevent complication of a process of welding coils together while maintaining insulating performance of the welded coils.

Effects of the Disclosure

As described above, the present disclosure is capable of preventing complication of a process of welding coils together while maintaining insulating performance of the welded coils.

BRIEF DESCRIPTION OF THE DRAWINGS

FIG. 7 is a diagram illustrating the states of insulating coatings in a removal step according to the first embodiment.

FIG. 12 is a diagram illustrating the results of temperature measurements conducted on surfaces of a welded lead wire portion according to the first embodiment.

FIG. 15 is a flowchart of a stator manufacturing method according to the second embodiment.

FIG. 16 is a diagram illustrating the states of insulating coatings in a removal step according to the second embodiment. (FIG. 16A is a diagram illustrating the state before removal of the insulating coatings. FIG. 16B is a diagram illustrating the state after removal of the insulating coatings.)

MODES FOR CARRYING OUT THE DISCLOSURE

Embodiments of the present disclosure are described below with reference to the drawings.

Structure of First Embodiment (Stator Structure)

With reference to FIG. 1 through FIG. 5, the structure of a stator 100 according to a first embodiment is described.

Figure 1:
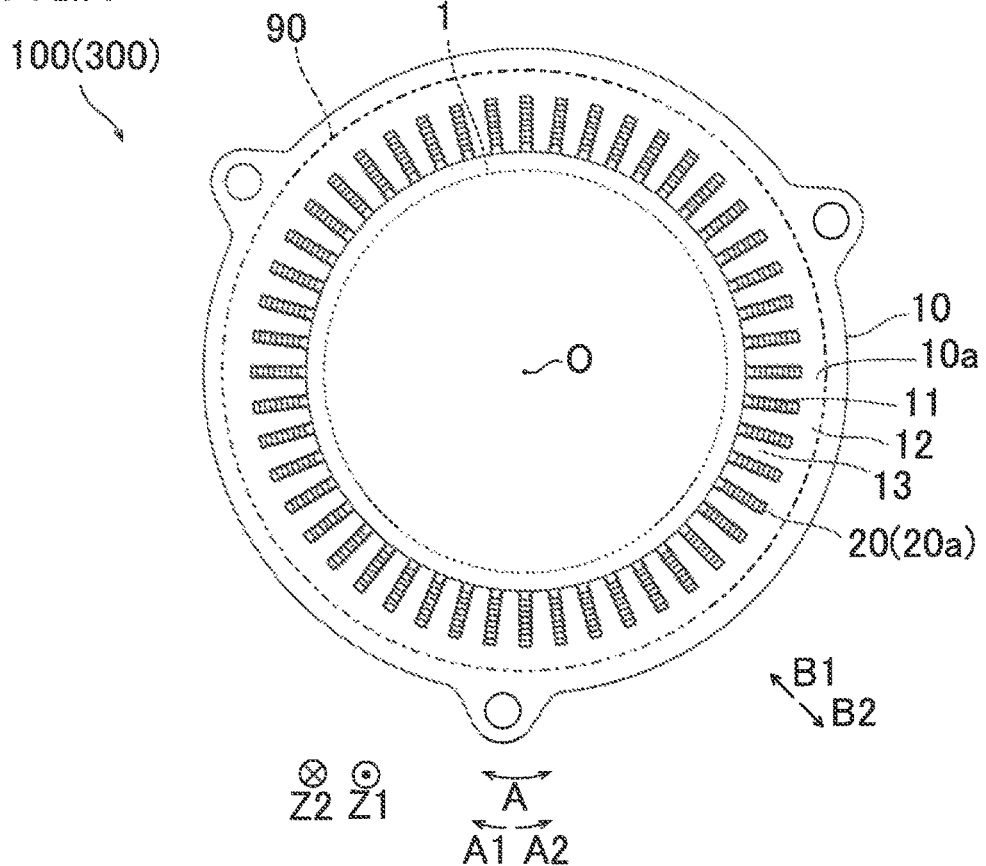
FIG. 1 is a plan view of a stator according to first and second embodiments.

According to the present description, "axial directions" and "center axis directions" mean directions along the axis of rotation (a symbol O) (Z-directions) of a stator core 10 (a rotor core 1) (see FIG. 1). Further, "circumferential directions" mean circumferential directions (A-directions, A1-direction, A2-direction) of the stator core 10. Further, "radially inward" means a direction toward the center of the stator core 10 (B1-direction). Further, "radially outward" means a direction toward the outside of the stator core 10 (B2-direction).

As illustrated in FIG. 1, the stator 100 is provided with the stator core 10 that is annular in shape. For example, the stator 100 structures part of an inner-rotor-type rotating electrical machine, and the stator core 10 is located facing a rotor core 1 in radial directions.

(Stator Core Structure)

The stator core 10 is provided with multiple slots 11. A segment conductor 20 is placed in each of the multiple slots 11.

The stator core 10 includes a back yoke 12 that joins together radially outward portions of the slots 11 in an annular shape, and multiple teeth 13 that are each provided between adjacent ones of the slots 11 and that extend radially inward from the back yoke 12. Further, insulating members (not illustrated) are placed in the slots 11 to insulate the segment conductors 20 from the stator core 10.

Figure 2:
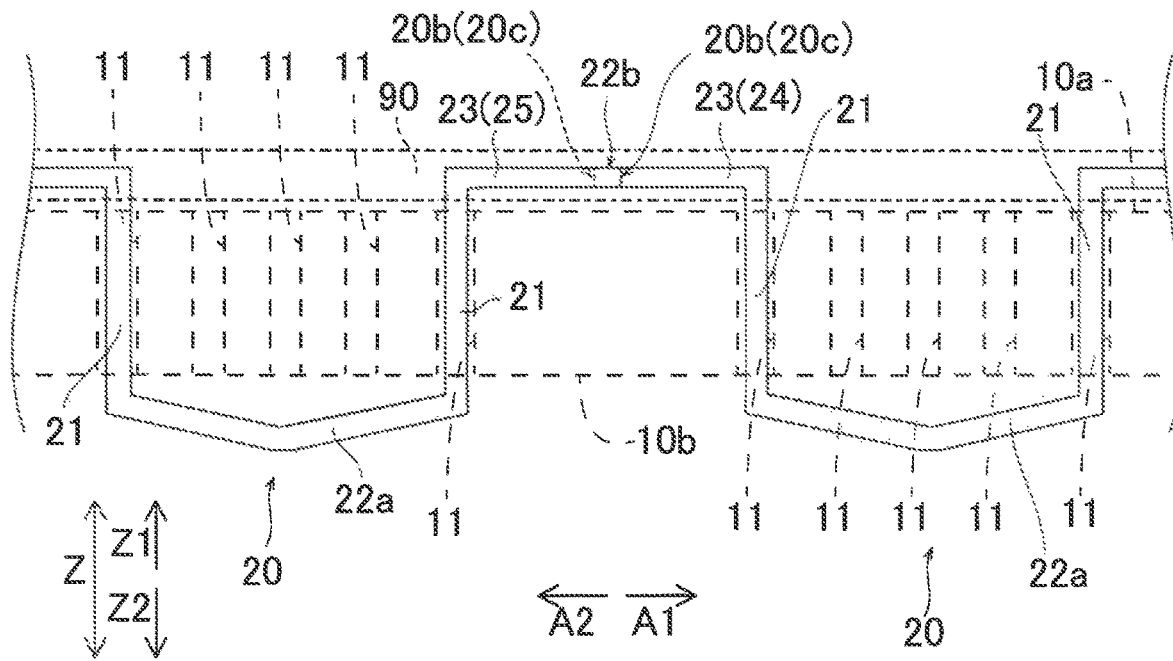
FIG. 2 is a schematic diagram illustrating the structure of segment conductors that are welded together according to the first embodiment.

As illustrated in FIG. 2, the multiple segment conductors 20 are placed in the stator 100. The segment conductor 20 is formed (structured) of, for example, a rectangular wire 20a (refer to FIG. 1). Further, the segment conductor 20 is structured with a copper wire covered with an insulating coating 30a. Specifically, the segment conductor 20 is structured with a conductor body made of copper and with the insulating coating 30a (refer to FIG. 4) provided on the surface of copper. The segment conductor 20 is covered with the insulating coating 30a except a removal portion 40, which will be described later. In the present description, the term "rectangular wire" means a wire that is substantially rectangular as a whole in cross section. It is noted that the segment conductor 20 is one example of a "coil" recited in the claims.

Specifically, each of the multiple segment conductors 20 is placed to cross two or more of the slots 11. More specifically, each of the multiple segment conductors 20 includes a pair of slot-held portions 21 that are held in different ones of the slots 11. Two or more of the slots 11 are provided between the slots 11 in which the pair of slot-held portions 21 are held. Further, each of the multiple segment conductors 20 includes a coil end portion 22a that joins together the pair of slot-held portions 21. Further, the coil end portion 22a is structured in such a manner as to protrude from an end face 10b of the stator core 10 (in a Z2-direction) opposite an end face 10a of the stator core 10 in a Z1-direction of the axial directions. Although FIG. 2 schematically illustrates that three slots 11 are arranged between the slots 11 in which the pair of slot-held portions 21 are held, this structure is illustrative only. Further, the slots 11 that are not necessary for explanation are omitted from the drawings.

The stator 100 is further provided with a coil end portion 22b that is formed by welding together lead wire portions 23, which will be described later, of different segment conductors 20. The coil end portion 22b is structured in such a manner as to protrude from the end face 10a of the stator core 10 in the Z1-direction of the axial directions. Although FIG. 2 schematically illustrates that the lead wire portions 23, which will be described later, extend along the end face 10a, this structure is illustrative only.

The stator 100 is further provided with an insulating member 90 that covers multiple coil end portions 22b. All the coil end portions 22b provided to the stator 100 are covered with a single insulating member 90. The insulating member 90 may be formed of resin, for example. The insulating member 90 is capable of insulating multiple removal portions 40 (refer to FIG. 4), which will be described later, from each other.

Further, the lead wire portions 23 are provided near tip portions 20b of the segment conductor 20. The lead wire portions 23 include a first lead wire portion 24 provided near one tip portion 20c (the tip portion 20b) of the segment conductor 20, and a second lead wire portion 25 provided near another tip portion 20d (the tip portion 20b) of the segment conductor 20. Further, the lead wire portions 23

(24, 25) are provided in such a manner as to extend along the circumferential directions. It is noted that the tip portion 20b, the tip portion 20c, and the tip portion 20d are each examples of a "first tip portion" and a "second tip portion" that are recited in the claims. Likewise, the first lead wire portion 24 and the second lead wire portion 25 are each examples of a "lead wire portion" recited in the claims.

Figure 3:
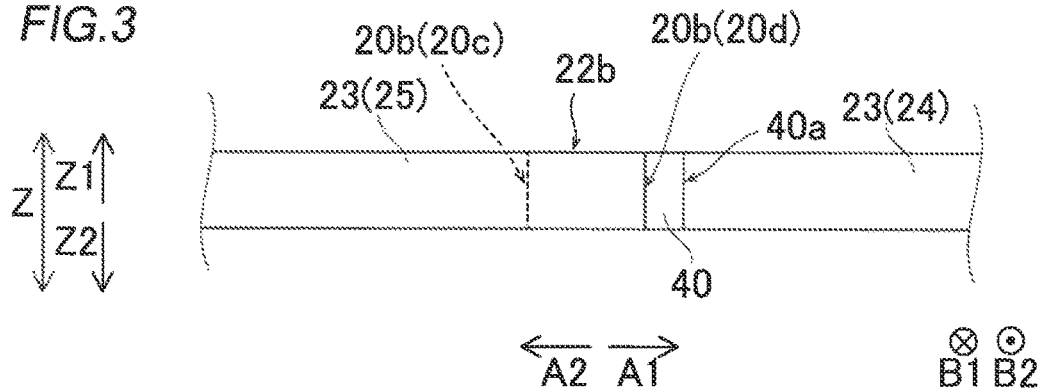
FIG. 3 is an enlarged partial view in the vicinity of a weld portion in FIG. 2.

As illustrated in FIG. 3, first surfaces 41 (refer to FIG. 4) of the lead wire portions 23 of different segment conductors 20 face each other in the radial directions. That is, the first surface 41 of the first lead wire portion 24 of one segment conductor 20 faces, in the radial directions, the first surface 41 of the second lead wire portion 25 of another segment conductor 20 that is separate from the one segment conductor 20.

Figure 4:
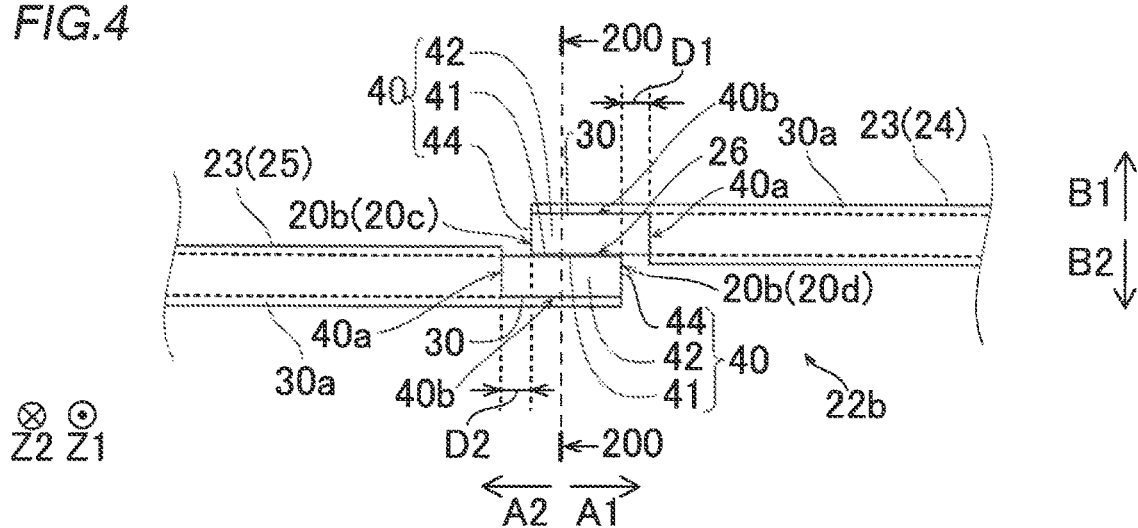
FIG. 4 is a plan view in the vicinity of the weld portion according to the first embodiment.

Further, as illustrated in FIG. 4, the first surfaces 41 that face each other are welded together. The welded first surfaces 41 form a weld portion 26.

Figure 7A:
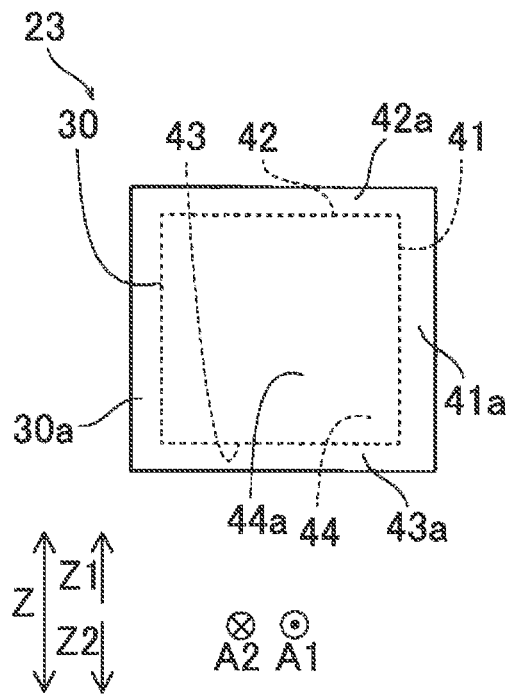
(FIG. 7A is a diagram illustrating the state before removal of the insulating coatings.
Figure 7B:
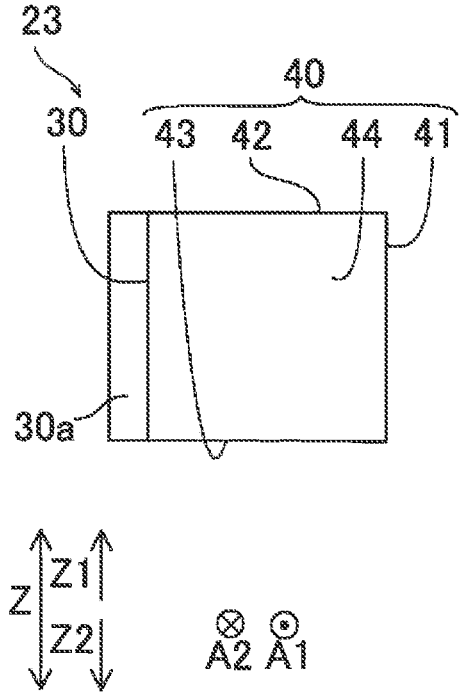
FIG. 7B is a diagram illustrating the state after removal of the insulating coatings.)

Further, the lead wire portion 23 (24, 25) is provided with the removal portion 40 that has been formed by removal of insulating coatings (41a, 42a, 43a, 44a) (refer to FIG. 7A). The first surface 41 is included in the removal portion 40. It is noted that the first surface 41 means the surface of copper that was covered with an insulating coating 41a until a step of removing the insulating coating 41a, which will be described later.

The lead wire portion 23 further includes a second surface 30 that is provided opposite the first surface 41 in the radial directions. The second surface 30 is covered with the insulating coating 30a. It is noted that the second surface 30 means the surface of copper covered with the insulating coating 30a.

The lead wire portion 23 further includes a third surface 42 provided between the first surface 41 and the second surface 30. The third surface 42 is included in the removal portion 40. It is noted that the third surface 42 means the surface of copper that was covered with an insulating coating 42a until a step of removing the insulating coating 42a, which will be described later.

Figure 5:
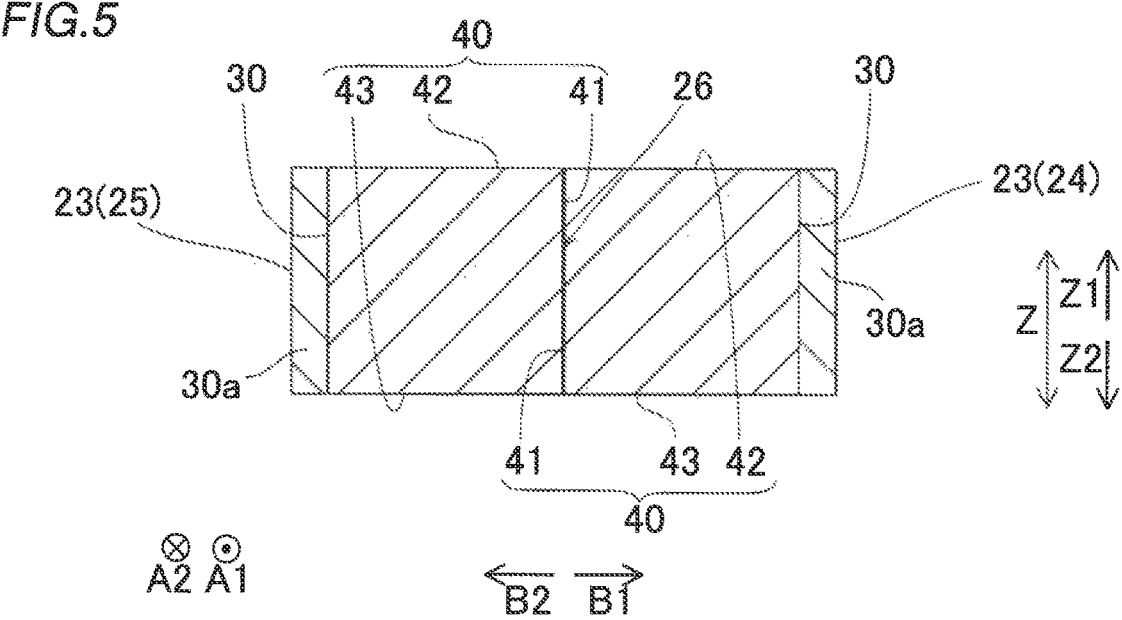
FIG. 5 is a cross-sectional view taken along line 200-200 in FIG. 4.

Further, as illustrated in FIG. 5, the lead wire portion 23 includes a fourth surface 43 that is provided on the opposite side (the Z2-direction side) from the third surface 42. The fourth surface 43 is included in the removal portion 40. It is noted that the fourth surface 43 means the surface of copper that was covered with an insulating coating 43a until a step of removing the insulating coating 43a, which will be described later.

Further, as illustrated in FIG. 4, the lead wire portion 23 includes an end face 44 that is provided at the tip portion 20b (20c, 20d). The end face 44 is included in the removal portion 40. It is noted that the end face 44 means the surface of copper that was covered with an insulating coating 44a until a step of removing the insulating coating 44a, which will be described later.

Further, the lead wire portion 23 includes an end portion 40a that is provided on the opposite side of the removal portion 40 from the tip portion 20b thereof in the circumferential directions. That is, the end portion 40a of the removal portion 40 of the first lead wire portion 24 is provided on the opposite side (the A1-direction side) from the tip portion 20c of the first lead wire portion 24. Likewise, the end portion 40a of the removal portion 40 of the second lead wire portion 25 is provided on the opposite side (the A2-direction side) from the tip portion 20d of the second lead wire portion 25. The end portion 40a is one example of a "circumferential end portion" recited in the claims.

Further, the end portion 40a of the first lead wire portion 24 is provided on the opposite side (the A1-direction side) of the tip portion 20d of the second lead wire portion 25 to be welded thereto, from the tip portion 20c thereof. In this case, the tip portion 20c and the tip portion 20d are respectively examples of a "first tip portion" and a "second tip portion" that are recited in the claims.

Further, the end portion 40a of the second lead wire portion 25 is provided on the opposite side (the A2-direction side) of the tip portion 20c of the first lead wire portion 24 to be welded thereto, from the tip portion 20d thereof. In this case, the tip portion 20c and the tip portion 20d are respectively examples of a "second tip portion" and a "first tip portion" that are recited in the claims.

Further, the end portion 40a of the first lead wire portion 24 is separated by a distance D1 from the tip portion 20d of the second lead wire portion 25 in the circumferential directions. Likewise, the end portion 40a of the second lead wire portion 25 is separated by a distance D2 from the tip portion 20c of the first lead wire portion 24 in the circumferential directions. The distance D1 and the distance D2 are substantially equal in magnitude to each other. It is noted that the distance D1 and the distance D2 are each examples of a "first distance" recited in the claims.

Further, in the removal portion 40 of each of the first lead wire portion 24 and the second lead wire portion 25, an end portion 40b is provided on the opposite side from a melted portion 60, which will be described later, in the radial directions (the B1-direction side in the first lead wire portion 24, the B2-direction side in the second lead wire portion 25). It is noted that according to the first embodiment, the end portion 40b of the removal portion 40 is an end portion of the third surface 42 in the radial directions (closer to the second surface 30). The end portion 40b is one example of a "radial end portion" recited in the claims.

(Stator Manufacturing Method)

Next, referring to FIG. 6 through FIG. 11, a method of manufacturing the stator 100 is described.

Figure 6:
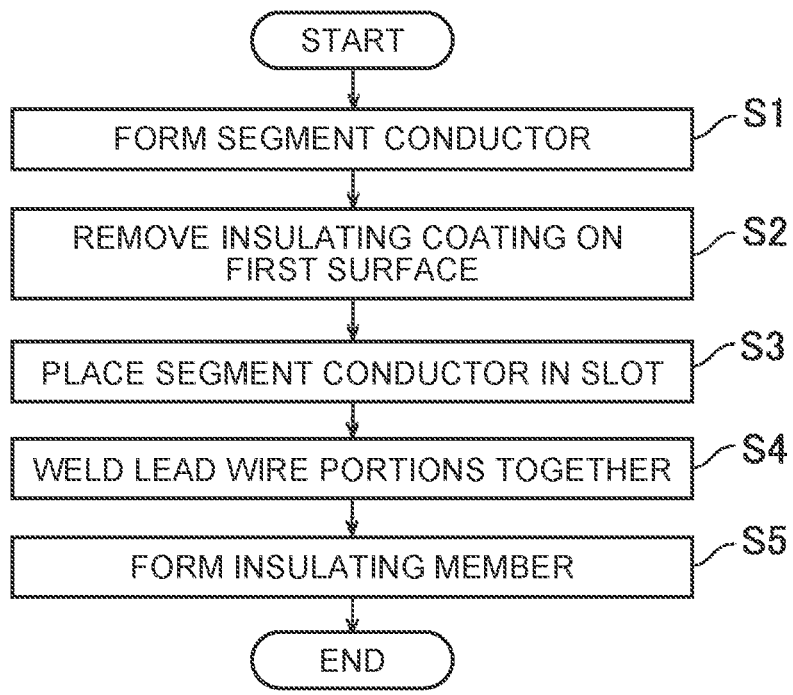
FIG. 6 is a flowchart of a stator manufacturing method according to the first embodiment.

As illustrated in FIG. 6, first, in step S1, a step of forming the segment conductor 20 is performed. Specifically, the segment conductor 20 is formed in a substantially U-shape (refer to FIG. 2).

Next, in step S2, a step of removing the insulating coating 41a (refer to FIG. 7A) on the first surface 41 is performed. Specifically, the insulating coating 41a covering the first surface 41 is removed by a cutting jig or the like, which is not illustrated in the drawings. Further, in addition to the insulating coating 41a on the first surface 41, the insulating coating 42a covering the third surface 42 (refer to FIG. 7A), the insulating coating 43a covering the fourth surface 43 (refer to FIG. 7A), and the insulating coating 44a covering the end face 44 of the tip portion 20b of the lead wire portion 23 are removed in this step. As a result, the first surface 41, the third surface 42, the fourth surface 43, and the end face 44 are all exposed (refer to FIG. 7B), so that the removal portion 40 is formed. In contrast, the insulating coating 30a covering the second surface 30 is not removed in this step. It is noted that the insulating coating 30a is integrally formed with the insulating coating 41a, the insulating coating 42a, the insulating coating 43a, and the insulating coating 44a. It is noted that the first surface 41, the third surface 42, the fourth surface 43, and the end face 44 may be formed by removal of part of copper during removal of the insulating coatings (41a, 42a, 43a, 44a), although the first embodiment illustrates that the insulating coatings (41a, 42a, 43a, 44a) are provided directly on the first surface 41, the third surface 42, the fourth surface 43, and the end face 44.

It is noted that as illustrated in FIG. 4, the step of removing the insulating coating 41a on the first surface 41 is a step of forming the removal portion 40 in such a manner that the end portion 40a of the first lead wire portion 24 is separated by the distance D1 from the tip portion 20d of the second lead wire portion 25, on the opposite side (the A1-direction side) of the tip portion 20d from the tip portion 20c of the first lead wire portion 24. The step of removing the insulating coating 41a on the first surface 41 is also a step of forming the removal portion 40 in such a manner that the end portion 40a of the second lead wire portion 25 is separated by the distance D2 from the tip portion 20c of the first lead wire portion 24, on the opposite side (the A2-direction side) of the tip portion 20c from the tip portion 20d of the second lead wire portion 25.

Further, the step of removing the insulating coating 41a on the first surface 41 is a step of forming the removal portion 40 in such a manner that in each of the first lead wire portion 24 and the second lead wire portion 25, a distance (D3, D5) between the melted portion 60 (refer to FIG. 11), which will be described later, and the end portion 40b (refer to FIG. 11) in the radial directions is less than a distance (D4, D6) between the melted portion 60 and the end portion 40a (refer to FIG. 11) in the circumferential directions.

It is noted that the sequence of step S1 and step S2 may be changed.

Then, as illustrated in FIG. 6, in step S3, the segment conductor 20 is placed in the slot 11. Specifically, the multiple segment conductors 20 are placed in the slots 11 in such a manner that the first surfaces 41 of the lead wire portions 23 (the first surface 41 of the first lead wire portion 24 and the first surface 41 of the second lead wire portion 25) of different ones of the segment conductors 20 face each other in the radial directions (refer to FIG. 3 through FIG. 5).

Next, in step S4, the lead wire portions 23 (the first surface 41 of the first lead wire portion 24 and the first surface 41 of the second lead wire portion 25) are welded together.

According to the first embodiment, this welding step is a step of welding, by a green laser 50, the first surface 41 of the lead wire portion 23 (the first lead wire portion 24) provided near the tip portion 20b (20c) of one of the segment conductors 20, and the first surface 41 of the lead wire portion 23 (the second lead wire portion 25) provided near the tip portion 20b (20d) of another one of the segment conductors 20 that is separate from the one segment conductor 20.

Specifically, welding by the green laser 50 is performed individually at multiple weld locations between the multiple segment conductors 20. More specifically, when welding by the green laser 50 at one weld location is finished, a laser oscillator 51, which will be described later, is moved to a place corresponding to another weld location to conduct welding at the other weld location. Alternatively, the stator core 10 may be rotated so that the laser oscillator 51 is relatively moved to a place corresponding to another weld location to conduct welding at the other weld location.

Figure 8:
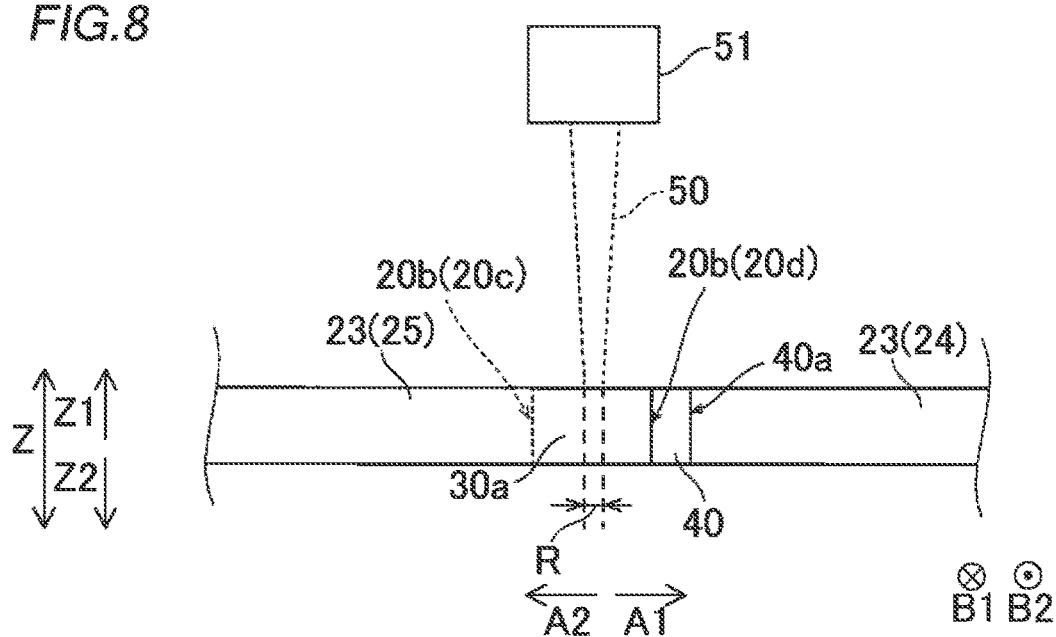
FIG. 8 is a side view illustrating application of a green laser in a welding step according to the first embodiment.

Here, according to the first embodiment, as illustrated in FIG. 8, the first surfaces 41 are welded together by the green laser 50, with the insulating coatings 41a (refer to FIG. 7A) on the first surfaces 41 being removed and with the insulating coatings 30a on the second surfaces 30 being unremoved. Specifically, the first surfaces 41 are welded together by the green laser 50, with the insulating coatings 41a on the first surfaces 41 (refer to FIG. 7A), the insulating coatings 42a on the third surfaces 42 (refer to FIG. 7A), the insulating coatings 43a on the fourth surfaces 43 (refer to FIG. 7A), and the insulating coatings 44a covering the end faces 44 (refer to FIG. 7A) being removed. The green laser 50 has a wavelength that is greater than or equal to 490 nm and less than or equal to 550 nm. Specifically, the green laser 50 is composed of the second harmonic of a YAG laser. More specifically, the wavelength of the green laser 50 is 532 nm. A laser medium of the green laser 50 is Nd:YAG (a solid state laser that uses a neodymium-doped yttrium-aluminum-garnet crystal). The green laser 50 (a YAG laser) is generated by excitation of a cylindrical (a rod-shaped) YAG crystal, for example. The green laser 50 is applied from the laser oscillator 51.

Further, in this welding step, the first surface 41 of the lead wire portion 23 (the first lead wire portion 24) extending from one side (the A1-direction side) in the circumferential directions and the first surface 41 of the lead wire portion 23 (the second lead wire portion 25) extending from the other side (the A2-direction side) in the circumferential directions are welded together by application of the green laser 50 from one side (the Z1-direction side) in the center axis directions. That is, the green laser 50 is applied along a direction crossing (perpendicular to) the directions in which the lead wire portions 23 extend. It is noted that in this case, the green laser 50 is applied to the third surfaces 42 (surfaces to which the laser is to be applied) that are provided on the Z1-direction side of the lead wire portions 23.

Figure 9:
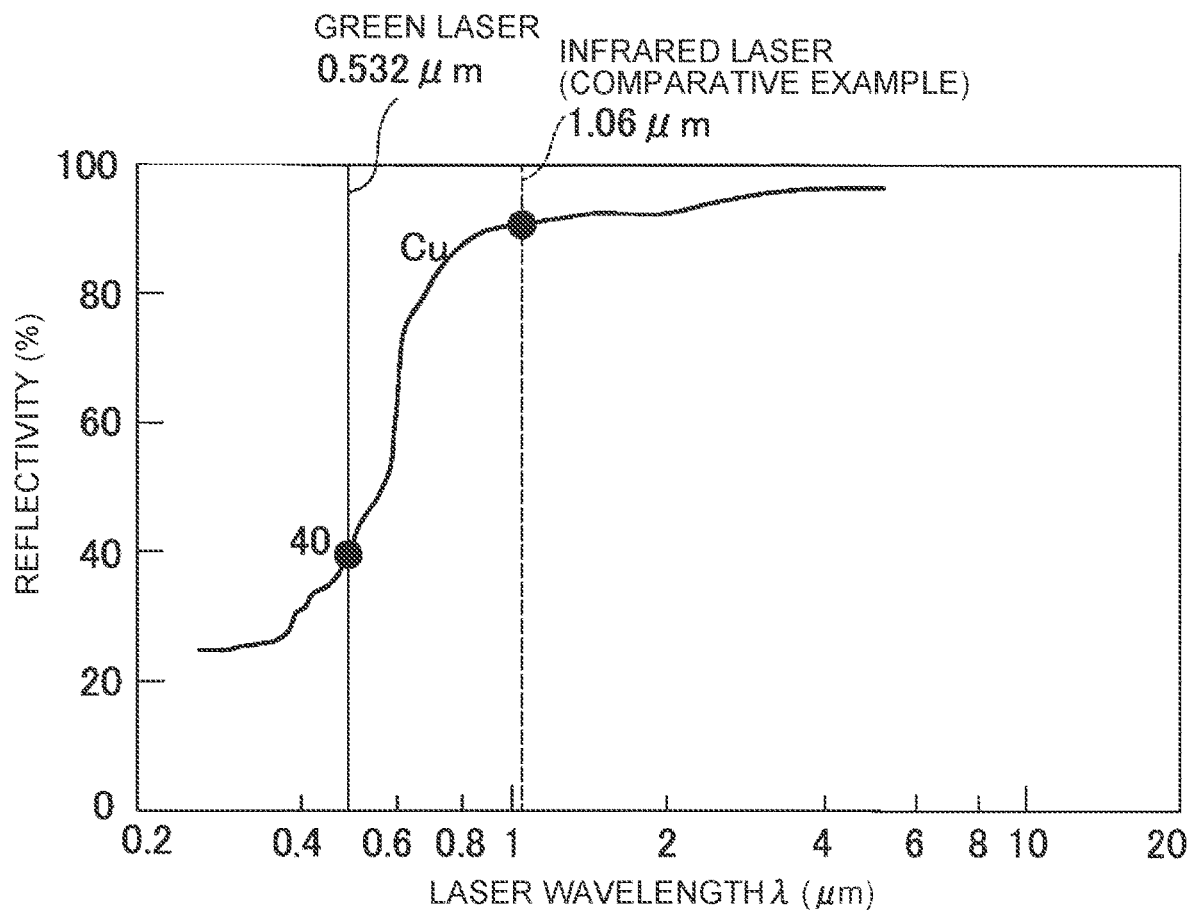
FIG. 9 is a graph illustrating the relationship between laser wavelength and reflectivity of copper.

Here, as illustrated in FIG. 9, the reflectivity of copper (Cu) for a green laser (with a wavelength of 532 nm) is about 40%. On the other hand, the reflectivity of copper (Cu) for an infrared laser (with a wavelength of 1.06 μm) (comparative example) is about 90%.

Figure 10:
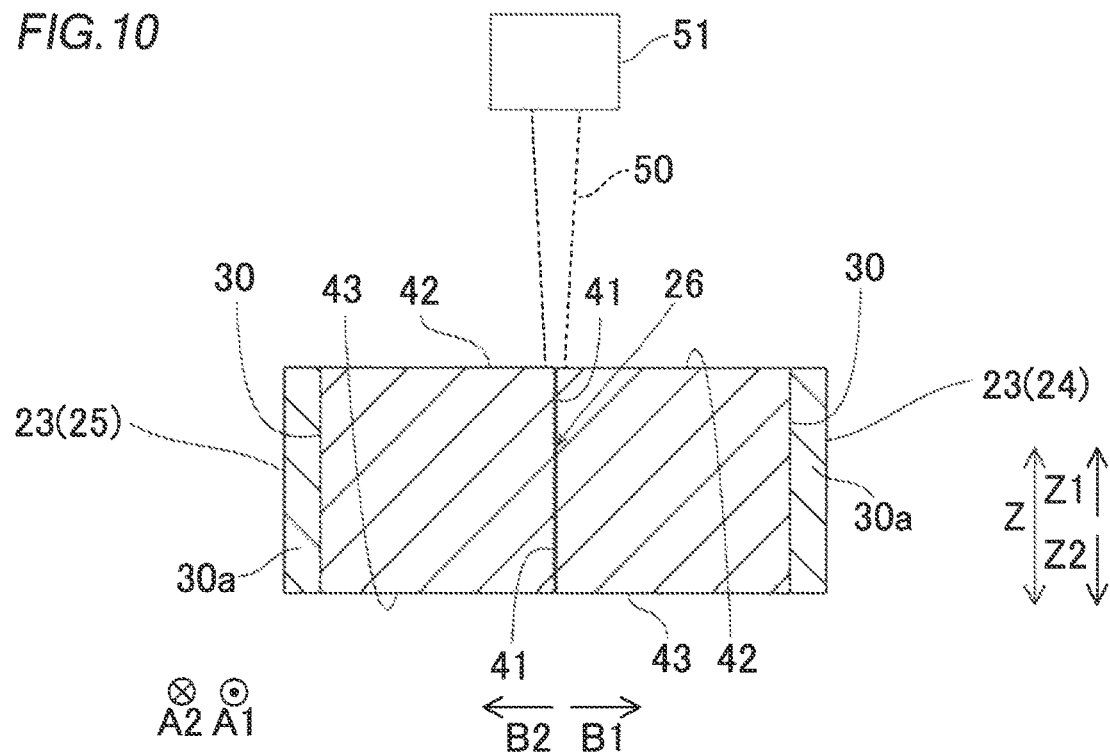
FIG. 10 is a cross-sectional view illustrating application of the green laser in the welding step according to the first embodiment.

Further, as illustrated in FIG. 10, the green laser 50 is applied, from above the weld portion 26 (the Z1-direction side), across both the third surface 42 of the first lead wire portion 24 and the third surface 42 of the second lead wire portion 25. As a result, a keyhole (a deep hole formed in a portion to which the laser is applied), which is not illustrated in the drawings, is formed at the interface between the first surfaces 41. Then, metal (copper) melted by heat of the green laser 50 flows into the formed keyhole and solidifies, so that the first surfaces 41 are welded together.

It is noted that the method of applying the green laser 50 is a method of applying a short pulsed laser to multiple locations along the first surfaces 41 (along the directions in which the lead wire portions 23 extend).

Further, according to the first embodiment, as illustrated in FIG. 4, the welding step is a step of welding the first surfaces 41 together by the green laser 50, with the end portion 40a of the first lead wire portion 24 being separated by the distance D1 in the first lead wire portion 24 from the tip portion 20d of the second lead wire portion 25, on the opposite side (the A1-direction side) of the tip portion 20d from the tip portion 20c of the first lead wire portion 24. Further, the welding step is a step of welding the first surfaces 41 together by the green laser 50, with the end portion 40a of the second lead wire portion 25 being separated by the distance D2 in the second lead wire portion 25 from the tip portion 20c of the first lead wire portion 24, on the opposite side (the A2-direction side) of the tip portion 20c from the tip portion 20d of the second lead wire portion 25.

Specifically, the distance D1 and the distance D2 each have a magnitude capable of preventing the insulating coating 30a near the end portion 40a from being damaged (carbonized) by heat of the green laser 50. It is noted that the distance D1 and the distance D2 are each sufficiently greater than a spot diameter R (e.g., about 300 μm, refer to FIG. 8) of the green laser 50.

Further, the first surfaces 41 are being pressed against each other in the radial directions by a jig, which is not illustrated in the drawings, during welding of the first surfaces 41 (application of the green laser 50).

Figure 11:
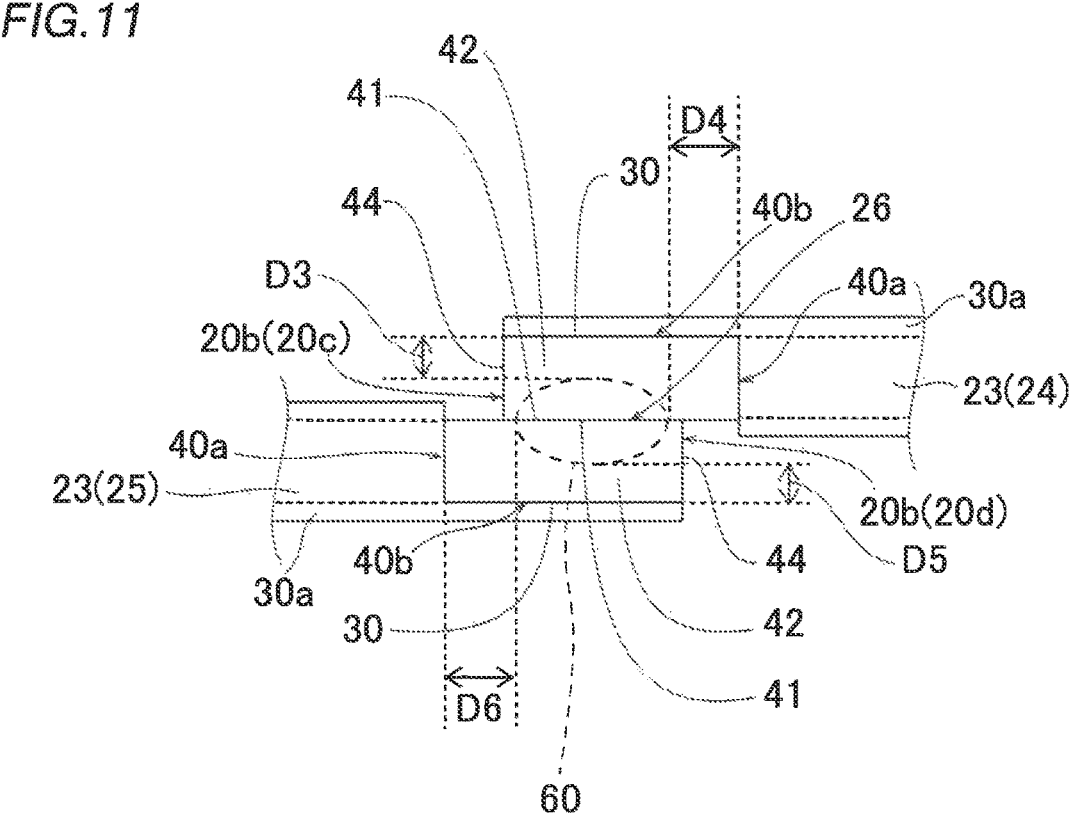
FIG. 11 is an enlarged partial view of FIG. 4, illustrating a melded portion formed in the welding step according to the first embodiment.

Further, as illustrated in FIG. 11, in each of the first lead wire portion 24 and the second lead wire portion 25, a copper portion of the third surface 42 of the removal portion 40 is melted by heat of the green laser 50 and thus forms the melted portion 60. The melted portion 60 spreads over an area larger than an area to which the green laser 50 has been applied actually. It is noted that as illustrated in FIG. 11, the melted portion 60 has an elliptical shape, for example.

Here, according to the first embodiment, the welding step is a step of welding the first surfaces 41 together by the green laser 50 in such a manner that in the first lead wire portion 24, the distance D3 between the melted portion 60 and the end portion 40b in the radial directions is less than the distance D4 between the melted portion 60 and the end portion 40a in the circumferential directions. Further, the welding step is a step of welding the first surfaces 41 together by the green laser 50 in such a manner that in the second lead wire portion 25, the distance D5 between the melted portion 60 and the end portion 40b in the radial directions is less than the distance D6 between the melted portion 60 and the end portion 40a in the circumferential directions. It is noted that the distance D3 and the distance D5 each mean the shortest distance between the melted portion 60 and the end portion 40b in the radial directions. Likewise, the distance D4 and the distance D6 each mean the shortest distance between the melted portion 60 and the end portion 40a in the radial directions. It is noted that the distance D3 and the distance D5 are substantially equal to each other. Further, the distance D4 and the distance D6 are substantially equal to each other. It is noted that the distance D3 and the distance D5 are each examples of a "second distance" recited in the claims. Further, the distance D4 and the distance D6 are each examples of a "third distance" recited in the claims.

The welding step is also a step of welding, by the green laser 50, the first surface 41 of the lead wire portion 23 (24) provided near one tip portion 20c of one segment conductor 20 that is placed to cross two or more slots 11 (refer to FIG. 2), and the first surface 41 of the lead wire portion 23 (25) provided near the other tip portion 20d of another segment conductor 20 that is separate from the one segment conductor 20 and that is placed to cross two or more slots 11 (refer to FIG. 2). It is noted that welding by the green laser 50 is performed with the slot-held portions 21 connecting to the lead wire portions 23 to be welded together being held in different slots 11.

Next, as illustrated in FIG. 6, in step S5, the insulating member 90 is formed on the end face 10a of the stator core 10. For example, by soaking the multiple coil end portions 22b in resin in liquid form, the insulating member 90 of resin is formed. It is noted that instead of forming the insulating member 90 of resin, the multiple coil end portions 22b may be varnished.

(Experimental Result)

Description is made on the results of comparison of the amount of scattered spatter (atoms released from the surface of metal by application of a laser or the like to the metal surface), between when welding was performed using the green laser 50 and when welding was performed using an infrared laser (a fiber laser) as a comparative example. It is demonstrated that the amount of scattered spatter when the green laser 50 was used was less than or equal to one tenth of that when the infrared laser (a fiber laser) was used. This may be because the keyhole is formed more stably when the green laser 50 is used than when the infrared laser (a fiber laser) is used.

Further, description is made on the results of comparison of the amount of heat required to provide the same weld area (4.2 mm$^2$), between when welding was performed using the green laser 50 and when welding was performed using the infrared laser (a fiber laser) as a comparative example. It is demonstrated that the amount of required heat when the green laser 50 was used was reduced to about one fourth of that when the infrared laser (a fiber laser) was used. This may be because copper (Cu) has a lower reflectivity (a higher absorptivity) for the green laser 50 than for an infrared laser (a fiber laser).

Further, when welding was performed by the infrared laser (a fiber laser) with the insulating coatings 41a being left on the first surfaces 41, blow holes (cavities formed by gas generated in or entering weld metal) were formed in the welded first surfaces 41. In contrast, when welding was performed by the green laser 50 with the insulating coatings 41a being left on the first surfaces 41, no blow holes were formed in the welded first surfaces 41.

Figure 12A:
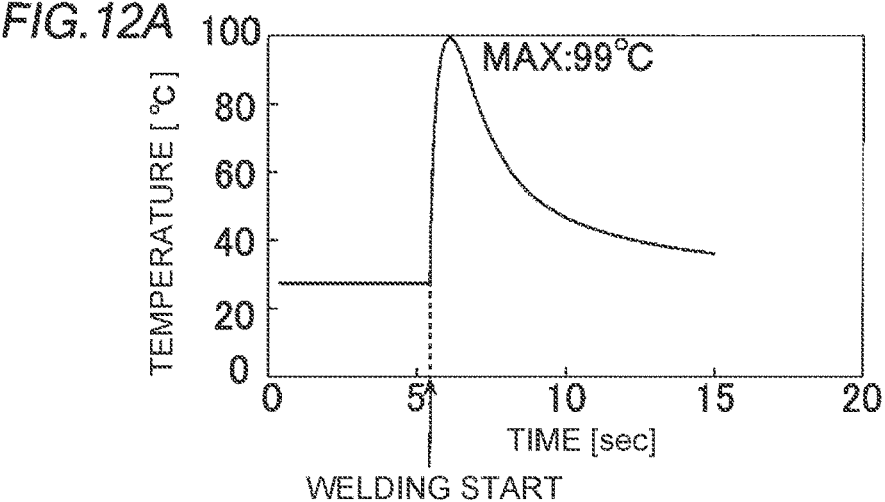
(FIG. 12A is the result on a third surface.
Figure 12B:
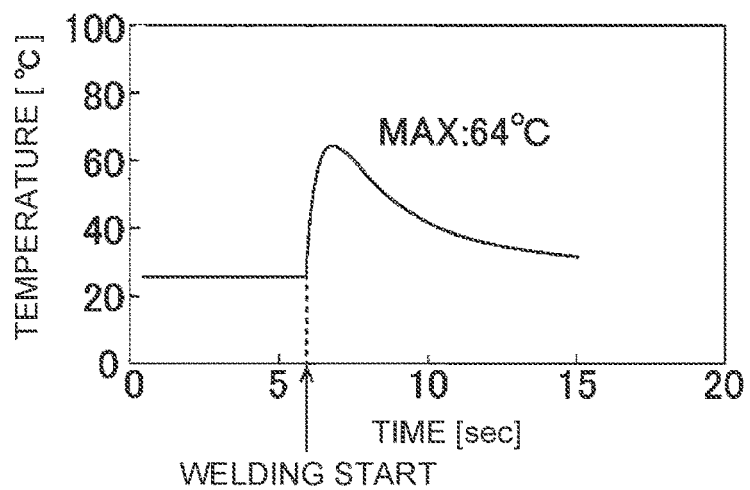
FIG. 12B is the result on a second surface.
Figure 12C:
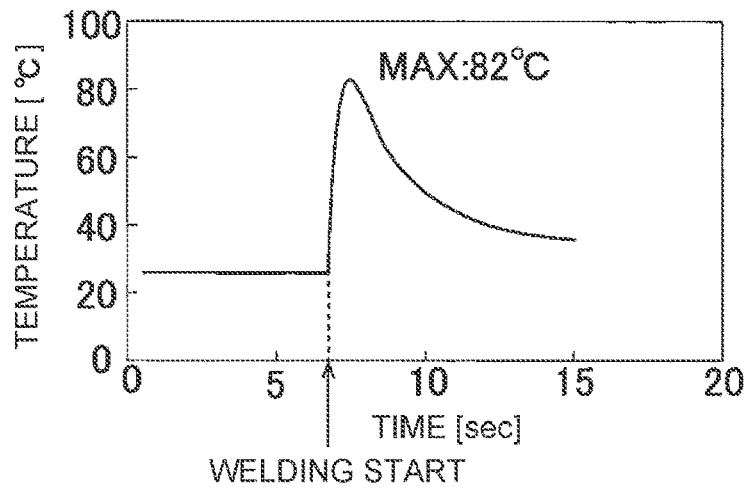
FIG. 12C is the result on a fourth surface.)

Next, with reference to FIG. 12, description is made on the temperature of the third surface 42 (refer to FIG. 12A), the temperature of the second surface 30 (refer to FIG. 12B) provided on the insulating coating 30a, and the temperature of the fourth surface 43 (refer to FIG. 12C), when welding was performed using the green laser 50.

As shown in FIG. 12A through FIG. 12C, the temperatures rose steeply at the moment when the welding by the green laser 50 was started. The temperature of the third surface 42 (refer to FIG. 12A) rose to 99° C. instantaneously. The temperature of the insulating coating 30a (refer to FIG. 12B) rose to 64° C. instantaneously. The temperature of the fourth surface 43 (refer to FIG. 12C) rose to 82° C. instantaneously. That is, it is demonstrated that neither the third surface 42, nor the insulating coating 30a, nor the fourth surface 43 rose to 100° C. It is noted that a temperature that damages (carbonizes) the insulating coating 30a is about 180° C.

Second Embodiment

Next, with reference to FIG. 13 through FIG. 17, a method of manufacturing a stator 300 according to a second embodiment is described. The method of manufacturing the stator 300 according to the second embodiment performs welding without removing insulating coatings 43a on fourth surfaces 43, in contrast to the first embodiment where welding is performed with the insulating coatings 43a on the fourth surfaces 43 being removed. It is noted that the same structures as in the first embodiment are illustrated with the same reference characters as in the first embodiment, and descriptions thereof are omitted.

(Coil Structure)

Figure 13:
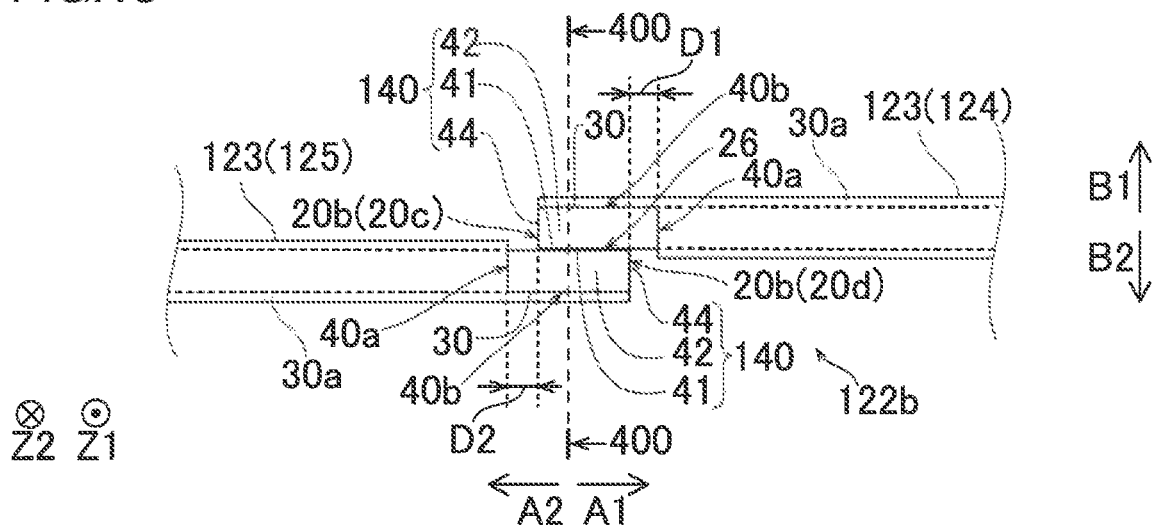
FIG. 13 is a plan view in the vicinity of a weld portion according to the second embodiment.

As illustrated in FIG. 13, lead wire portions 123 (a first lead wire portion 124 and a second lead wire portion 125) of the stator 300 (refer to FIG. 1) are welded together at a weld portion 26 of a coil end portion 122b. It is noted that the first lead wire portion 124 and the second lead wire portion 125 are each examples of a "lead wire portion" recited in the claims.

Figure 14:
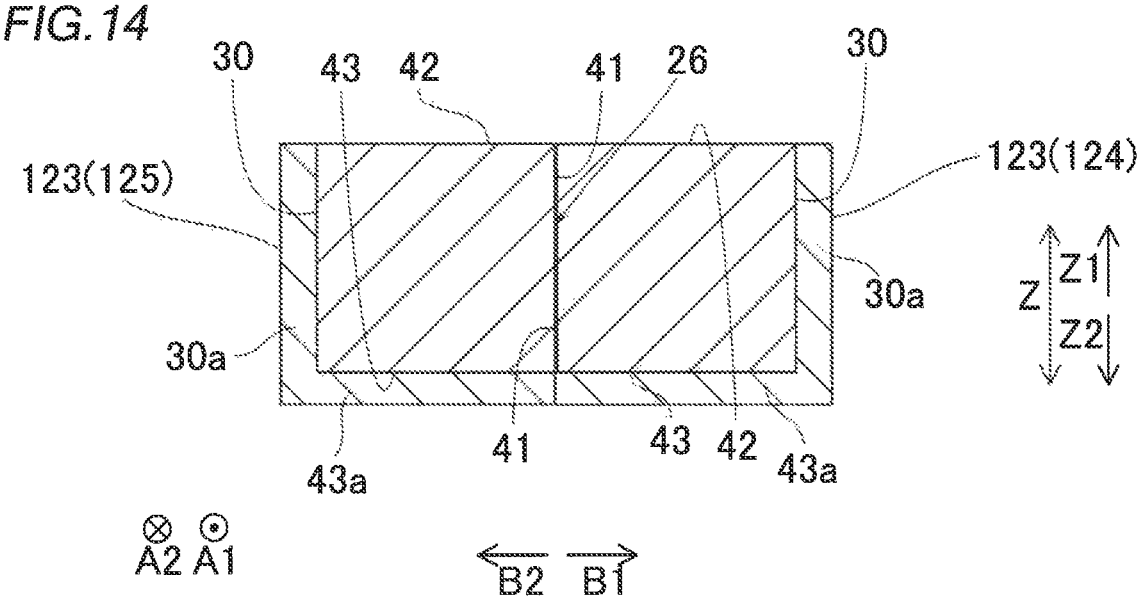
FIG. 14 is a cross-sectional view taken along line 400-400 in FIG. 13.

As illustrated in FIG. 14, the fourth surface 43 is covered with an insulating coating 43a. The insulating coating 43a is integrally formed with an insulating coating 30a that covers a second surface 30. It is noted that according to the second embodiment, a first surface 41, a third surface 42, and an end face 44 are included in a removal portion 140.

(Stator Manufacturing Method)

Figure 17:
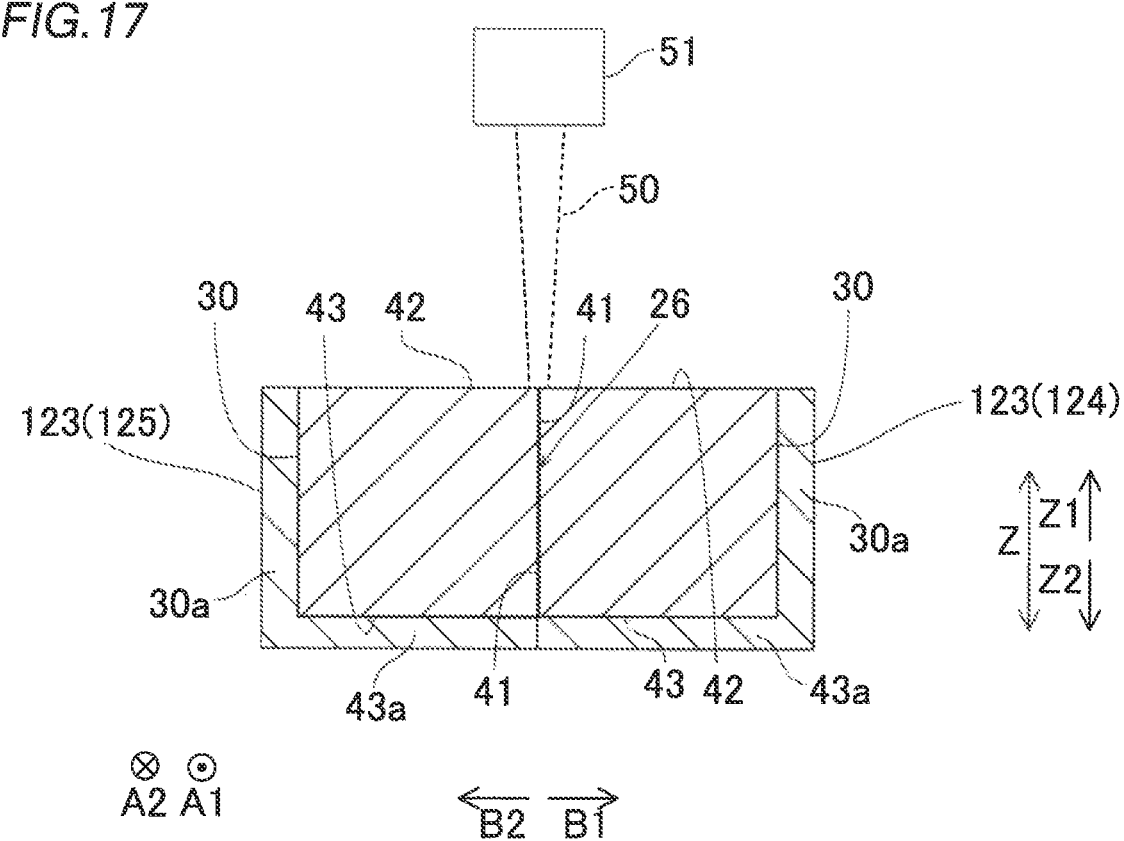
FIG. 17 is a cross-sectional view illustrating application of a green laser in a welding step according to the second embodiment.

Next, referring to FIG. 15 through FIG. 17, the method of manufacturing the stator 300 is described.

As illustrated in FIG. 15, in step S12, a step of removing an insulating coating 41a (refer to FIG. 16A) on the first surface 41 is performed. In this step, the insulating coating 41a on the first surface 41, an insulating coating 42a on the third surface 42 (refer to FIG. 16A), and an insulating coating 44a that covers the end face 44 of a tip portion 20b are removed. As a result, the first surface 41, the third surface 42, and the end face 44 are all exposed (refer to FIG. 16B), so that the removal portion 140 is formed. In contrast, neither the insulating coating 30a covering the second surface 30, nor the insulating coating 43a covering the fourth surface 43 is removed in this step.

Next, in step S14, the lead wire portions 123 (the first surface 41 of the first lead wire portion 124 and the first surface 41 of the second lead wire portion 125) are welded together.

According to the second embodiment, as illustrated in FIG. 17, the first surfaces 41 are welded together by the green laser 50, with both the insulating coatings 41a on the first surfaces 41 (refer to FIG. 16A) and the insulating coatings 42a on the third surfaces 42 (refer to FIG. 16A) being removed, and with neither the insulating coatings 30a on the second surfaces 30 nor the insulating coatings 43a on the fourth surfaces 43 being removed. Specifically, the first surfaces 41 are welded together by the green laser 50, with the insulating coatings 41a, the insulating coatings 42a, and the insulating coatings 44a all being removed.

The other structures according to the second embodiment are the same as those according to the first embodiment.

[Effects of the First and Second Embodiments]

The first and second embodiments provide the following effects.

According to the first and second embodiments, as described above, a method of manufacturing a stator (100, 300) includes a step of removing an insulating coating (41a) on a first surface (41) that is a surface to be welded and that is included in a lead wire portion (23) provided near a tip portion (20b, 20c, 20d) of each of a plurality of coils (20), and a step of placing the plurality of coils (20) in slots (11) of a stator core (10) in such a manner that the first surfaces (41) of the lead wire portions (23, 123) of different ones of the plurality of coils (20) face each other. The method of manufacturing the stator (100, 300) further includes a step of welding together the first surfaces (41) by a green laser (50), with the insulating coatings (41a) on the first surfaces (41) being removed and with the insulating coatings (30a) on second surfaces (30), opposite the first surfaces (41), of the lead wire portions (23, 123) being unremoved. Here, most metallic materials have a higher absorptivity for the green laser (50) than for an infrared laser. For this reason, welding the first surfaces (41) together by the green laser (50), which is relatively highly absorbable by metal, allows heat generated in a melted portion (60) of the lead wire portions (23, 123) by application of the green laser (50) to be absorbed in metal portions in the vicinity of the melted portion (60) and also makes it relatively hard for the heat to transfer from the melted portion (60) to other portions of the lead wire portions (23, 123). Thus, even when the first surfaces (41) are welded together by the green laser (50) with the insulating coatings (30a) on the second surfaces (30) unremoved, it is possible to prevent the insulating coatings (30a) on the second surfaces (30) from being damaged (carbonized) by the heat of the green laser (50). This allows easy placement (resin formation, coating) of an insulating member (90) on the tops of the insulating coatings (30a) on the second surfaces (30). Further, since the insulating coatings (30a) on the second surfaces (30) are not damaged (carbonized), a step of removing the insulating coatings (30a) on the second surfaces (30) beforehand to place the insulating member (90) (resin formation, coating) is omittable. Therefore, it is possible to prevent complication of a process of welding the coils (20) together while maintaining insulating performance of the welded coils (20).

Further, according to the first and second embodiments, as described above, the step of welding together the first surfaces (41) by the green laser (50) is a step of welding together the first surfaces (41) of the lead wire portions (23, 123) of the coils (20) that are structured of rectangular wires 20a, by the green laser (50) with the insulating coatings (41a) on the first surfaces (41) being removed and with the insulating coatings (30a) on the second surfaces (30) being unremoved. This structure facilitates an increase in the area of the weld between the first surfaces (41), as compared with when the lead wire portions (23, 123) are round wires, thus being capable of increasing the joint strength of the weld using the green laser (50).

Further, according to the first and second embodiments, as described above, the step of removing the insulating coating (41a) on the first surface (41) is a step of removing the insulating coating (42a) on a third surface (42) in addition to the first surface (41). The third surface (42) is provided between the first surface (41) and the second surface (30), and is a surface to which the green laser (50) is to be applied. Further, the step of welding together the first surfaces (41) by the green laser (50) is a step of welding together the first surfaces (41) by the green laser (50) with the insulating coatings (42a) on both the first surfaces (41) and the third surfaces (42) being removed, and with the insulating coatings (30a) on the second surfaces (30) being unremoved. This structure is capable of preventing heat of the green laser (50) from transferring to the insulating coatings (30a) on the second surfaces (30) through the insulating coatings (42a) on the third surfaces (42). Thus, it is possible to more reliably prevent the insulating coatings (30a) on the second surfaces (30) from being damaged (carbonized). Further, in contrast to when the green laser (50) is applied with the insulating coatings (42a) on the third surfaces (42) being unremoved, the likelihood that it becomes hard to place the insulating member (90) (such as insulating resin or varnish) (resin formation, coating) due to the insulating coatings (42a) on the third surfaces (42) being damaged (carbonized) by the heat of the green laser (50) can be prevented.

Further, according to the first embodiment, as described above, the step of removing the insulating coatings (41a, 42a) on both the first surface (41) and the third surface (42) is a step of removing the insulating coating (43a) on a fourth surface (43) in addition to both the first surface (41) and the third surface (42), the fourth surface (43) being opposite the third surface (42). Further, the step of welding together the first surfaces (41) by the green laser (50) is a step of welding together the first surfaces (41) by the green laser (50) with the insulating coatings (41a, 42a, 43a) on the first surfaces (41), on the third surfaces (42), and on the fourth surfaces (42) being removed, and with the insulating coatings (30a) on the second surfaces (30) being unremoved. This structure is capable of preventing heat of the green laser (50) from transferring to the insulating coatings (30a) on the second surfaces (30) through the insulating coatings (43*a*) on the fourth surfaces (43). Thus, it is possible to much more reliably prevent the insulating coatings (30*a*) on the second surfaces (30) from being damaged (carbonized). Further, in contrast to when the green laser (50) is applied with the insulating coatings (43*a*) on the fourth surfaces (43) being unremoved, it is possible to prevent the likelihood that the insulating coatings (43*a*) on the fourth surfaces (43) will be damaged (carbonized) by heat of the green laser (50) to make it hard to place (coat) the insulating member (90) thereon.

According to the second embodiment, as described above, the step of welding together the first surfaces (41) by the green laser (50) is a step of welding together the first surfaces (41) by the green laser (50) with the insulating coatings (41*a*, 42*a*) on both the first surfaces (41) and the third surfaces (42) being removed, and with the insulating coatings (30*a*) on neither the second surfaces (30) nor the insulating coatings (43*a*) on fourth surfaces (43) opposite the third surfaces (42) being removed. This structure is capable of enhancing insulation of the fourth surfaces (43), as compared with when the insulating coatings (43*a*) on the fourth surfaces (43) are removed.

Further, according to the first and second embodiments, as described above, the step of welding together the first surfaces (41) by the green laser (50) is a step of welding together the first surface (41) of the lead wire portion (23, 123) extending from one side in circumferential directions and the first surface (41) of the lead wire portion (23, 123) extending from another side in the circumferential directions, by application of the green laser (50) from one side in the center axis directions. According to this structure, the lead wire portions (23, 123) extend in the circumferential directions. Thus, as compared with when the lead wire portions (23, 123) extend in the center axis directions, it is possible to easily increase the lengths of parts of the lead wire portions (23, 123) to which the green laser (50) is applied from one side in the center axis directions. Therefore, it is possible to easily increase the area of the weld between the first surfaces (41).

Further, according to the first and second embodiments, as described above, in each of the lead wire portion (23, 123) from the one side and the lead wire portion (23, 123) from the other side, a circumferential end portion (40*a*) of a removal portion (40, 140) formed by removal of the insulating coatings (41*a*, 42*a*, 43*a*, 44*a*) and including the first surface (41) is provided opposite, in the circumferential directions, a first tip portion (20*b*, 20*c*, 20*d*) that is the tip portion thereof, and the step of welding together the first surfaces (41) by the green laser (50) is a step of welding together the first surfaces (41) by the green laser (50) with the circumferential end portion (40*a*) being separated by a first distance (D1, D2) from a second tip portion (20*b*, 20*d*, 20*c*) that is the tip portion of the lead wire portion (23, 123) to be welded thereto, on the opposite side of the second tip portion (20*b*, 20*d*, 20*c*) from the first tip portion (20*b*, 20*c*, 20*d*). Further, the step of removing the insulating coating (41*a*) on the first surface (41) is a step of forming the removal portion (40, 140) in each of the lead wire portion (23, 123) from the one side and the lead wire portion (23, 123) from the other side in such a manner that the circumferential end portion (40*a*) is separated by the first distance (D1, D2) from the second tip portion (20*b*, 20*c*, 20*d*) of the lead wire portion (23, 123) to be welded thereto, on the opposite side of the second tip portion (20*b*, 20*d*, 20*c*) from the first tip portion (20*b*, 20*c*, 20*d*). According to this structure, the circumferential end portion (40*a*) and the second tip portion (20*b*, 20*d*, 20*c*) are separated from each other by the first distance (D1, D2) in the circumferential directions. Thus, it is possible to reduce the amount of heat transferred from the second tip portion (20*b*, 20*d*, 20*c*) to the circumferential end portion (40*a*), as compared with when the circumferential end portion (40*a*) and the second tip portion (20*b*, 20*d*, 20*c*) are provided at the same position in the circumferential directions. Therefore, it is possible to prevent the insulating coating (30*a*) that is provided on the opposite side of the circumferential end portion (40*a*) from the first tip portion (20*b*, 20*c*, 20*d*) from being damaged (carbonized).

Further, according to the first and second embodiments, as described above, the step of welding together the first surfaces (41) by the green laser (50) is a step of welding together the first surfaces (41) by the green laser (50) in such a manner that in each of the lead wire portion (23, 123) from the one side and the lead wire portion (23, 123) from the other side, a second distance (D3, D5) between a melted portion (60) of the removal portion (40, 140) and a radial end portion (40*b*) of the removal portion (40, 140) in the radial directions is less than a third distance (D4, D6) between the melted portion (60) and the circumferential end portion (40*a*) in the circumferential directions. The melted portion (60) is formed on a third surface (42) that is a surface to which the green laser (50) is to be applied. The radial end portion (40*b*) is provided opposite the melted portion (60) in the radial directions. Further, the step of removing the insulating coating (41*a*) on the first surface (41) is a step of forming the removal portion (40, 140) in such a manner that in each of the lead wire portion (23, 123) from the one side and the lead wire portion (23, 123) from the other side, the second distance (D3, D5) between the melted portion (60) and the radial end portion (40*b*) in the radial directions is less than the third distance (D4, D6) between the melted portion (60) and the circumferential end portion (40*a*) in the circumferential directions. According to this structure, it is possible to reduce the width of the third surface (42) in the radial directions, as compared with when the second distance (D3, D5) is greater than the third distance (D4, D6). As a result, it is possible to increase the distance between the lead wire portions (23, 123) that are adjacent to each other in the radial directions and, in turn, to reduce the amount of heat transferred between the lead wire portions (23, 123) that are adjacent to each other in the radial directions.

Further, according to the first and second embodiments, as described above, the step of welding together the first surfaces (41) by the green laser (50) is a step of welding together, by the green laser (50), the first surfaces (41) of the lead wire portions (23, 123) of the coils (20) that are made of copper. Here, copper has a much higher absorptivity for a green laser than for an infrared laser. Thus, since the coils (20) are made of copper, welding the first surfaces (41) together by using the green laser (50) is particularly effective in preventing the insulating coatings (30*a*) on the second surfaces (30) from being damaged (carbonized) by heat of the green laser (50).

Further, according to the first and second embodiments, as described above, the step of welding together the first surfaces (41) by the green laser (50) is a step of welding, by the green laser (50), the first surface (41) of the lead wire portion (23, 123) provided near one tip portion (20*b*, 20*c*) of one of the coils (20) that is placed to cross a plurality of the slots (11), and the first surface (41) of the lead wire portion (23, 123) provided near another tip portion (20*b*, 20*d*) of another of the coils (20) that is separate from the one coil (20) and that is placed to cross the plurality of slots (11).

According to this structure, by performing welding by the green laser (50), it is possible to join together the coils (20) that are placed to cross the plurality of slots (11) by welding using the green laser (50).

Further, according to the first and second embodiments, as described above, the step of welding together the first surfaces (41) by the green laser (50) is a step of welding together the first surfaces (41) by the green laser (50) with a wavelength that is greater than or equal to 490 nm and less than or equal to 550 nm. This structure is capable of increasing the absorptivity of copper for the green laser (50), compared with when the green laser (50) has a wavelength of, for example, about 1 µm. Thus, it is possible to efficiently weld the first surfaces (41) together.

Further, according to the first and second embodiments, as described above, the step of welding together the first surfaces (41) by the green laser (50) is a step of welding together the first surfaces (41) by the green laser (50) composed of the second harmonic of a YAG laser. Here, metal has a higher absorptivity for the YAG laser than for a $CO_2$ laser. Thus, by using the green laser (50) that is the second harmonic of a YAG laser, it is possible to perform welding even when energy of the green laser (50) is relatively low.

Modifications

The embodiments disclosed herein are to be considered in all respects as illustrative, not restrictive. The scope of the present disclosure is defined by the claims, not the description of the above embodiments, and includes all changes (modifications) that fall within the scope of the claims and the equivalents thereof.

For example, although the first and second embodiments illustrate by example that the first surfaces 41 face each other in the radial directions, the present disclosure is not limited to this. The first surfaces 41 may face each other in directions other than the radial directions.

Further, although the first and second embodiments illustrate by example that the segment conductor 20 (a coil) is structured of the rectangular wire 20a, the present disclosure is not limited to this. For example, the coil may be structured of a round wire or the like.

Further, although the first and second embodiments illustrate by example that welding by the green laser 50 is performed with both the insulating coatings 42a on the third surfaces 42 and the insulating coatings 44a on the end faces 44 being removed, the present disclosure is not limited to this. For example, welding by the green laser 50 may be performed with at least part of the insulating coatings 42a and the insulating coatings 44a being left.

Further, although the first and second embodiments illustrate by example that the first surfaces 41 of the lead wire portions 23 (123) that extend in the circumferential directions are welded together, the present disclosure is not limited to this. For example, the first surfaces 41 of the lead wire portions 23 (123) that extend in directions other than the circumferential directions may be welded together.

Further, although the first and second embodiments illustrate by example that the insulating coatings are removed by a cutting jig or the like, the present disclosure is not limited to this. For example, the insulating coatings may be removed by a laser.

Further, although the first and second embodiments illustrate by example that the coil is the segment conductor 20, the present disclosure is not limited to this. For example, the coil may be structured as a concentrated winding coil that is wound (formed) multiple turns on the teeth 13.

Further, although the first and second embodiments illustrate by example that the wavelength of the green laser 50 is 532 nm, the present disclosure is not limited to this. For example, a green laser with a wavelength other than 532 nm may be used, as long as the wavelength is greater than or equal to 490 nm and less than or equal to 550 nm.

Further, although the first and second embodiments illustrate by example that a YAG laser is used as the green laser 50, the present disclosure is not limited to this. For example, a $CO_2$ laser or a semiconductor laser may be used as a green laser.

Further, although the first and second embodiments illustrate by example that the method of applying the green laser 50 is a method of applying a short pulsed laser to multiple locations along the first surfaces 41, the present disclosure is not limited to this. The method of applying the green laser may be a method of causing the green laser to scan a predetermined length along the first surfaces 41.

In this case, for example, a green laser with a wavelength of 532 nm may be used that is a lamp-pumped YAG laser and that is composed of the second harmonic of a fundamental wave with a wavelength of 1064 nm. Lamp pumping is a pumping method that uses a lamp as a pump source to pump a laser medium. Here, the lamp-pumped YAG laser has a relatively high energy output. For this reason, use of the lamp-pumped YAG laser allows efficient welding of the segment conductors 20. It is noted that pulsed application is also possible using the lamp-pumped YAG laser.

Further, another example of the laser scan may use a green laser with a wavelength of 515 nm that is a disk laser and that is composed of the second harmonic of a fundamental wave with a wavelength of 1030 nm. The disk laser is generated by pumping of a thin disk-shaped YAG crystal. Here, the disk laser has a relatively high energy output and has a laser application area smaller than that of a lamp-pumped type. For this reason, use of the disk laser allows effective and accurate welding of the segment conductors 20.

DESCRIPTION OF THE REFERENCE NUMERALS

10: STATOR CORE
11: SLOT
20: SEGMENT CONDUCTOR (COIL)
20a: RECTANGULAR WIRE
20b, 20c, 20d: TIP PORTION (FIRST TIP PORTION) (SECOND TIP PORTION)
23, 123: LEAD WIRE PORTION
24, 124: FIRST LEAD WIRE PORTION (LEAD WIRE PORTION)
25, 125: SECOND LEAD WIRE PORTION (LEAD WIRE PORTION)
30: SECOND SURFACE
30a: INSULATING COATING (INSULATING COATING ON SECOND SURFACE)
40, 140: REMOVAL PORTION
40a: END PORTION (CIRCUMFERENTIAL END PORTION)
40b: END PORTION (RADIAL END PORTION)
41: FIRST SURFACE
41a: INSULATING COATING (INSULATING COATING ON FIRST SURFACE)
42: THIRD SURFACE

42*a*: INSULATING COATING (INSULATING COATING ON THIRD SURFACE)
43: FOURTH SURFACE
43*a*: INSULATING COATING (INSULATING COATING ON FOURTH SURFACE)
50: GREEN LASER
60: MELTED PORTION
100, 300: STATOR
D1, D2: DISTANCE (FIRST DISTANCE)
D3, D5: DISTANCE (SECOND DISTANCE)
D4, D6: DISTANCE (THIRD DISTANCE)

The invention claimed is:

1. A method of manufacturing a stator, the stator provided with a plurality of coils structured of copper wires covered with insulating coatings, the method comprising:
   a step of removing the insulating coating on a first surface of a lead wire portion provided near a tip portion of each of the plurality of coils, without removing the insulating coating on a second surface of the lead wire portion, the first surface being a surface to be welded, the second surface being opposite the first surface, wherein all surfaces near the tip portion of each of the plurality of coils, except for the second surface, have the insulating coating removed;
   a step of placing the plurality of coils in slots of a stator core in such a manner that the first surfaces of the lead wire portions of different ones of the plurality of coils face each other, and
   a step of welding together the first surfaces by a green laser with the insulating coatings on the first surfaces being removed and with the insulating coatings on the second surfaces being unremoved.

2. The method of manufacturing the stator according to claim 1, wherein the step of welding together the first surfaces by the green laser is a step of welding together the first surfaces of the lead wire portions of the coils that are structured of rectangular wires, by the green laser with the insulating coatings on the first surfaces being removed and with the insulating coatings on the second surfaces being unremoved.

3. The method of manufacturing the stator according to claim 1, wherein the step of welding together the first surfaces by the green laser is a step of welding together the first surface of the lead wire portion extending from one side in circumferential directions and the first surface of the lead wire portion extending from another side in the circumferential directions, by application of the green laser from one side in center axis directions of the stator core.

4. The method of manufacturing the stator according to claim 3, wherein
   in each of the lead wire portion from the one side and the lead wire portion from the other side, a circumferential end portion of a removal portion formed by removal of the insulating coatings and including the first surface is provided opposite, in the circumferential directions, a first tip portion that is the tip portion thereof,
   the step of welding together the first surfaces by the green laser is a step of welding together the first surfaces by the green laser, with the circumferential end portion being separated by a first distance from a second tip portion that is the tip portion of the lead wire portion to be welded thereto, on the opposite side of the second tip portion from the first tip portion, and
   the step of removing the insulating coating on the first surface is a step of forming the removal portion in each of the lead wire portion from the one side and the lead wire portion from the other side in such a manner that the circumferential end portion is separated by the first distance from the second tip portion of the lead wire portion to be welded thereto, on the opposite side of the second tip portion from the first tip portion.

5. The method of manufacturing the stator according to claim 4, wherein
   the step of welding together the first surfaces by the green laser is a step of welding together the first surfaces by the green laser in such a manner that in each of the lead wire portion from the one side and the lead wire portion from the other side, a second distance between a melted portion of the removal portion and a radial end portion of the removal portion in radial directions is less than a third distance between the melted portion and the circumferential end portion in the circumferential directions, the melted portion being formed on a third surface that is a surface to which the green laser is to be applied, the radial end portion being provided opposite the melted portion in the radial directions, and
   the step of removing the insulating coating on the first surface is a step of forming the removal portion in such a manner that in each of the lead wire portion from the one side and the lead wire portion from the other side, the second distance between the melted portion and the radial end portion in the radial directions is less than the third distance between the melted portion and the circumferential end portion in the circumferential directions.

6. The method of manufacturing the stator according to claim 1, wherein the step of welding together the first surfaces by the green laser is a step of welding, by the green laser, the first surface of the lead wire portion provided near one tip portion of one of the coils that is placed to cross a plurality of the slots, and the first surface of the lead wire portion provided near another tip portion of another of the coils that is separate from the one of the coils and that is placed to cross the plurality of slots.

7. The method of manufacturing the stator according to claim 1, wherein the step of welding together the first surfaces by the green laser is a step of welding together the first surfaces by the green laser with a wavelength that is greater than or equal to 490 nm and less than or equal to 550 nm.

8. The method of manufacturing the stator according to claim 7, wherein the step of welding together the first surfaces by the green laser is a step of welding together the first surfaces by the green laser composed of a second harmonic of a YAG laser.

9. The method of manufacturing the stator according to claim 7, wherein the step of welding together the first surfaces by the green laser is a step of welding together the first surfaces by the green laser with a wavelength of 532 nm, the green laser being a lamp pumped YAG laser and composed of a second harmonic of a fundamental wave with a wavelength of 1064 nm.

10. The method of manufacturing the stator according to claim 7, wherein the step of welding together the first surfaces by the green laser is a step of welding together the first surfaces by the green laser with a wavelength of 515 nm, the green laser being a disk laser and composed of a second harmonic of a fundamental wave with a wavelength of 1030 nm.

* * * * *